United States Patent Office 3,080,256
Patented Mar. 5, 1963

3,080,256
COATED MINERAL FILLER FOR ORGANIC POLYMERS, AND METHOD OF FORMING THE COATED FILLER
Wayne M. Bundy, Elizabeth, N.J., assignor to Georgia Kaolin Company, a corporation of New Jersey
No Drawing. Filed Feb. 6, 1959, Ser. No. 791,514
15 Claims. (Cl. 117—72)

This invention relates to mineral treatment and mineral products and particularly to a process for forming a mineral material suitable as a filler for organic materials and particularly in polar organic materials and to a treated mineral suitable as a filler in such organic materials. This application is a continuation-in-part of my application Serial No. 722,838, filed March 21, 1958, now abandoned.

There has long been a need in the plastic and related industries for a low cost functional filler. Such a filler should be capable of imparting improved physical strength and electrical properties as well as attractive appearance at low cost.

Clays and clay materials are typical of such mineral materials and as typical minerals they have not been usable as fillers in plastics and related organic systems because of their natural hydrophilic nature. Clays as they ordinarily occur in nature are generally hydrophilic and tend to take on large quantities of water. Such clays are not ordinarily compatible with organic systems and they are not ordinarily dispersible or wettable by organic vehicles. As a result, naturally occurring clays have been avoided as fillers in the plastic and related organic fields.

I have discovered a method which overcomes these hydrophilic characteristics of minerals such as natural clays and makes it possible to disperse such normally hydrophilic clays in organic systems. By my method I am able to obtain in clays and other mineral materials highly satisfactory wetting characteristics for organic systems and I have found that when so treated the materials provide plastic systems with improved physical properties over that imparted by untreated materials.

The process of this invention may perhaps be best understood by referring to the following examples showing certain preferred practices of this invention.

EXAMPLE I

A secondary Georgia kaolin was mixed with water in a concentration such as to have a solid to water ratio of 1 to 4. The mixture was stirred mechanically to assure dispersion. 0.4% of ethylene diamine was added to the slurry as a 75% solution and mechanically mixed for five minutes. After the slurry was well dispersed, 0.4% of polyester resin (Pittsburgh Plate Glass, Selectron 5003L) was introduced into the slurry in the form of a 2% emulsion. The emulsion was prepared by simultaneously agitating the resin-water mixture and gradually adding dilute ammonium hydroxide to maintain a pH of about 8 until all of the resin had been dispersed in the emulsion. The emulsion was added to the clay slurry slowly and mixed for about ten minutes. After the slurry had been completely mixed, the clay was flocculated from the slurry by the addition of a 5% solution of sulfuric acid and alum. The pH during flocculation was maintained above 7. The flocculated clay was filtered and oven dried at a temperature of 125° C. After drying, the clay was pulverized to eliminate lumps formed during drying.

It was noted that the treated clays changed from thixotropic to slightly dilatant in character.

The clay produced by the above processing steps was added to polyester resin (Pittsburgh Plate Glass, Selectron 5003L). The clay was found to be highly wettable by the polyester resin and to impart greatly reduced viscosities to the polyester resin as compared with untreated clays.

The steps outlined in Example I were repeated varying the amount of ethylene diamine from 0.2% to 2.% by weight of the clay and varying the amount of emulsified resin added to the system from 0.2% to 2.% by weight of the clay. It was found that the effectiveness of treatment dropped when the ethylene diamine was reduced below 0.2% and showed no improvement in effectiveness beyond 2.%. The same was true in the case of the added resin. It was noted that the most desirable results were achieved when the ethylene diamine concentration was in a 1:1 ratio with the concentration of added resin. Optimum results were obtained at concentration between 0.4% and 0.5% ethylene diamine and resin.

I have found that in addition to ethylene diamine, other polyamines may be used in the process. Polyamines having at least two terminal amino groups are most effective for my process. For example, I have repeated the process described in connection with Example I above using the following compounds: hexamethylene diamine, tetraethylene diamine, diethylene triamine, tetraethylene pentamine and guanidine with similar satisfactory results.

It is not necessary that the organic material used in the emulsion be the organic material to which the treated clay will ultimately be added. The organic material must, however, be limited to those materials containing one of the following groups (1) acid hydroxyl groups (e.g. phenolic resin), (2) carboxyl groups (e.g. acrylic acid), (3) carbonyl groups (e.g. acetone and benzaldehyde), (4) epoxy groups (e.g. epoxy resins), (5) nitro groups (e.g. nitro cellulose), and (6) sulfur analogs (e.g. mercaptans and sulfonic acid). The organic material may be any organic material from the foregoing groups which is compatible with the organic materials to which the clay will be added as a filler. However, I have found that for maximum compatibility the organic material used in the emulsion should be the same as the material to which the clay will be added as a filler.

I have found that the minerals treated according to my process must have a solubility less than $10^{-3}$ molar. For example barites ($BaSO_4$) solubility $10^{-5}$ sphalerite (ZnS) solubility $7 \times 10^{-6}$, rutile ($TiO_2$) solubility $\ll 10^{-3}$, kaolinite solubility $\ll 10^{-3}$, mullite ($3Al_2O_3 \cdot 2SiO_2$) solubility $\ll 10^{-3}$, graphite (C) solubility $\ll 10^{-3}$ are all effectively coated by my process. On the other hand calcium carbonate ($CaCO_3$) solubility $1.5 \times 10^{-2}$, and calcium sulfate ($CaSO_4$) solubility $1.6 \times 10^{-2}$ are not effectively coated. These coated minerals have been found satisfactory as a filler for any moderate to low polarity organic material. I have found that best results are obtained when the mineral, e.g. clay, after treatment, is dried at a low temperature and particularly below the decomposition temperature of the organic material used in the emulsion.

I have also found that best results are obtained when high resistivity water is used throughout the process. The same generalization also applies to the clay materials used. However, it should be noted that high resistivity is not critical but merely desirable for optimum results.

EXAMPLE II

A series of clays were treated according to the process outlined in Example I but using the amounts of materials and with the results obtained in Table I.

Table I

| Clay | Percent ethylene diamine | Percent resin | Viscosity at 25° C. | | | |
|---|---|---|---|---|---|---|
| | | | Control | | Treated | |
| | | | 10 r.p.m. | 100 r.p.m. | 10 r.p.m. | 100 r.p.m. |
| 1 | 0.4 | 0.4 | 6,000 | 5,200 | 4,000 | 4,200 |
| 2 | 0.5 | 0.5 | 10,800 | 8,040 | 5,000 | 5,920 |
| 3 | 0.6 | 0.6 | 25,600 | 15,520 | 3,800 | 6,580 |
| 4 | 0.6 | 0.6 | 35,200 | 15,540 | 6,300 | 12,400 |

The viscosity data set out in Table I was obtained on a Brookfield viscosimeter using the clays at 40% fill in "Selectron 5003L" resin.

Clay and other minerals treated according to Examples I and II have been satisfactorily used as a filler in other organic systems than polyester resin. For example, clay treated according to my invention has been incorporated into phenolic resin, short oil alkyd systems and similar organic systems.

While I have illustrated certain preferred practices of this invention in the foregoing disclosure, it will be understood that this invention may be otherwise practiced within the scope of the following claims.

I claim:

1. The method of forming a mineral material suitable as a filler for organic polymers comprising the steps of mixing in water particles of a mineral material having a solubility less than $10^{-3}$ molar in water to form a slurry, adding to the slurry an aqueous solution of a polyamine having at least two terminal amino groups, mixing the slurry containing the polyamine to assure dispersal of the polyamine and coating of the mineral particles with the polyamine, adding to the slurry a small amount of an aqueous emulsion of an organic polymer selected from the group consisting of organic compounds containing one of the groups (1) acid hydroxyl groups, (2) carboxyl groups, (3) carbonyl groups, (4) epoxy groups, (5) nitro groups, and (6) sulfur analogs, mixing said slurry to disperse the emulsion, and coat the polyamine coated particles with the organic polymer, separating the coated mineral material from the slurry by the addition of an acidic reagent, and drying at a temperature below the decomposition temperature of the organic polymer.

2. The method of forming a mineral material suitable as a filler for organic polymers comprising the steps of mixing in water particles of a mineral material having a solubility less than $10^{-3}$ molar in water to form a slurry, adding to the slurry a polyamine having at least two terminal amino groups, mixing the polyamine in the slurry to assure dispersal of the polyamine and coating of the mineral particles with the polyamine, adding to the slurry a small amount of an aqueous emulsion of the organic polymer to which the treated mineral material will ultimately be added as a filler, mixing said slurry to disperse the emulsion and coat the polyamine coated particles with the organic polymer, separating the coated mineral material from the slurry by the addition of an acidic reagent, and drying at a temperature below the decomposition temperature of the organic polymer.

3. The method of forming a clay suitable as a filler for organic polymers comprising the steps of mixing particles of the clay in water to form a slurry, adding to the slurry an aqueous solution of a polyamine having at least two terminal amino groups, mixing the slurry containing the polyamine to assure dispersal of the polyamine and coating of the clay with the polyamine, adding to the slurry a small amount of an aqueous emulsion of organic polymer selected from the group consisting of organic compounds containing one of the groups (1) acid hydroxyl groups, (2) carboxyl groups, (3) carbonyl groups, (4) epoxy groups, (5) nitro groups, and (6) sulfur analogs, mixing said slurry to disperse the emulsion and coat the polyamine coated particles with the organic polymer, separating the coated clay from the slurry by the addition of an acidic reagent, and drying at a temperature below the decomposition temperature of the organic polymer.

4. The method of forming a mineral material suitable as a filler for organic polymers comprising the steps of mixing in water particles of the mineral material having a solubility less than $10^{-3}$ molar in water to form a slurry, adding to the slurry less than about 2% by weight of a polyamine having at least two terminal amino groups in the form of a concentrated aqueous solution, mixing the slurry containing the polyamine to assure dispersal of the polyamine and coating of the mineral material with the polyamine, adding to the slurry a small amount of an aqueous emulsion of an organic polymer selected from the group consisting of organic compounds containing one of the groups (1) acid hydroxyl groups, (2) carboxyl groups, (3) carbonyl groups, (4) epoxy groups, (5) nitro groups, and (6) sulfur analogs, mixing said slurry to disperse the emulsion and coat the polyamine coated particles with the organic polymer, separating the coated mineral material from the slurry by the addition of an acidic reagent, and drying at a temperature below the decomposition temperature of the organic polymer.

5. The method of forming a clay suitable as a filler for organic polymers comprising the steps of mixing clay particles in water to form a slurry, adding to the slurry between about 0.2% and about 2.0% of a polyamine having at least two terminal amino groups, mixing the slurry containing the polyamine to assure dispersal of the polyamine and coating of the clay with the polyamine, adding to the slurry a small amount of an aqueous emulsion of the organic polymer to which the treated clay will ultimately be added as a filler, mixing said slurry to disperse the emulsion and coat the polyamine coated clay with the organic polymer, separating the coated clay from the slurry by the addition of an acidic reagent, and drying at a temperature below the decomposition temperature of the organic polymer.

6. The method of forming a mineral material suitable as a filler for organic polymers comprising the steps of mixing in water particles of a mineral material having a solubility less than $10^{-3}$ molar in water to form a slurry, adding to the slurry between about 0.2% and about 2.0% of a polyamine selected from the group consisting of ethylene diamine, hexamethylene diamine, tetraethylene diamine, diethylene triamine, tetraethylene pentamine and guanidine in the form of a concentrated aqueous solution, mixing the slurry containing the polyamine to assure dispersal of the polyamine and coating of the mineral particles with the polyamine, adding to the slurry a small amount of an aqueous emulsion of an organic polymer selected from the group consisting of organic compounds containing one of the groups (1) acid hydroxyl groups, (2) carboxyl groups, (3) carbonyl groups, (4) epoxy groups, (5) nitro groups, and (6) sulfur analogs, mixing said slurry to disperse the emulsion and coat the polyamine coated particles with the organic polymer, separating the coated mineral material from the slurry by addition of an acidic reagent, and drying at a temperature below the decomposition temperature of the organic polymer.

7. The method of forming a clay suitable as a filler for organic polymers comprising the steps of mixing particles of the clay in water to form a slurry, adding to the slurry between about 0.2% and about 2.0% of a polyamine selected from the group consisting of ethylene diamine, hexamethylene diamine, tetraethylene diamine, diethylene triamine, tetraethylene pentamine and guanidine in the form of a concentrated aqueous solution, mixing the slurry containing the polyamine to assure dispersal of the polyamine and coating of the clay particles with the polyamine, adding to the slurry a small amount of an aqueous emulsion of an organic polymer selected from the groups consisting of organic compounds containing one of the groups (1) acid hydroxyl groups, (2) carboxyl groups, (3) carbonyl groups, (4) epoxy groups, (5) nitro groups, and (6) sulfur analogs, mixing said slurry to disperse the emulsion and coat the polyamine coated clay with the organic polymer, separating the coated clay from the slurry by addition of an acidic reagent, and drying at a temperature below the decomposition temperature of the organic polymer.

8. The method of forming a clay suitable as a filler for organic polymers comprising the steps of mixing clay particles in water to form a slurry, adding ethylene diamine to the slurry, mixing the slurry to assure dispersal of the ethylene diamine and coating of the clay particles with the ethylene diamine, adding to the slurry a small amount of an aqueous emulsion of the organic polymer to which the treated clay will ultimately be added as a filler, mixing said slurry to disperse the emulsion and coat the ethylene diamine coated clay with the organic polymer, separating the coated clay from the slurry, by addition of an acidic reagent, and drying at a temperature below the decomposition temperature of the organic polymer.

9. The method of forming a clay suitable as a filler for organic polymers comprising the steps of mixing clay particles in water to form a slurry, adding to the slurry between about 0.2% to about 2.0% by weight of ethylene diamine, mixing the slurry to assure dispersal of the ethylene diamine and coating of the clay particles with the ethylene diamine, adding to the slurry a small amount of an aqueous emulsion of an organic polymer compatible with said organic polymers to which the treated clay will ultimately be added as a filler, and selected from the group consisting of organic compounds containing one of the groups (1) acid hydroxyl group, (2) carboxyl groups, (3) carbonyl groups, (4) epoxy groups, (5) nitro groups, and (6) sulfur analogs, mixing said slurry to disperse the emulsion and coat the ethylene diamine coated particles with the organic polymer, separating the coated clay from the slurry by addition of an acidic reagent, and drying at a temperature below the decomposition temperature of the organic polymer.

10. The method of forming a clay suitable as a filler for organic polymers comprising the steps of mixing clay particles in water to form a slurry, adding to the slurry between about 0.2% to about 2% by weight of ethylene diamine, mixing the slurry to assure dispersal of the ethylene diamine and coating of the clay particles with the ethylene diamine, adding to the slurry a small amount of an aqueous emulsion of the organic polymer to which the treated clay will ultimately be added as a filler, mixing said slurry to disperse the emulsion and coat the ethylene diamine coated clay with the organic polymer, separating the coated clay from the slurry by addition of an acidic reagent, and drying at a temperature below the decomposition temperature of the organic polymer.

11. The method of forming a clay suitable as a filler for organic polymers comprising the steps of mixing clay particles in water to form a slurry, adding to the slurry an aqueous solution of ethylene diamine to coat the clay particles with ethylene diamine, mixing the slurry about 0.2% to 1.0% by weight of the organic polymer to which the treated clay will ultimately be added as a filler, mixing said slurry to disperse the emulsion and coat the ethylene diamine coated clay particles with the organic polymer, separating the coated clay from the slurry by addition of an acidic reagent, and drying at a temperature below the decomposition temperature of the organic polymer.

12. A mineral material suitable as a filler for organic polymers, said mineral material having an aqueous solubility less than $10^{-3}$ molar and having thereon a coating of polyamine having at least two terminal amino groups, and on the polyamine a coating of an organic polymer compatible with said organic polymer to which the mineral material will be added as a filler and selected from the group consisting of organic compounds containing one of the groups (1) acid hydroxyl groups, (2) carboxyl groups, (3) carbonyl groups, (4) epoxy groups, (5) nitro groups, and (6) sulfur analogs.

13. A mineral material suitable as a filler for organic polymers, said mineral material having an aqueous solubility less than $10^{-3}$ molar and having thereon a coating of polyamine and on the polyamine, a coating of the organic polymer to which the clay will be added as a filler.

14. A mineral material suitable as a filler for organic materials, said mineral material having an aqueous solubility less than $10^{-3}$ molar having thereon a coating of between about 0.2% and about 2.0% by weight of a polyamine having at least two terminal amino groups, and on the polyamine a coating of about 0.2% to about 2.0% of an organic polymer selected from the group consisting of organic compounds containing one of the groups (1) acid hydroxyl groups, (2) carboxyl groups, (3) carbonyl groups, (4) epoxy groups, (5) nitro groups, and (6) sulfur analogs.

15. A clay suitable as a filler for organic materials, said clay having thereon a coating of between about 0.2% and about 2.0% by weight of polyamine having at least two terminal amino groups and on the polyamine a coating of about 0.2% to about 2.0% of an organic polymer selected from the group consisting of organic compounds containing one of the groups (1) acid hydroxyl groups, (2) carboxyl groups, (3) carbonyl groups, (4) epoxy groups, (5) nitro groups, and (6) sulfur analogs.

References Cited in the file of this patent

UNITED STATES PATENTS

| | | |
|---|---|---|
| 2,126,925 | Ryan | Aug. 16, 1938 |
| 2,531,396 | Carter et al. | Nov. 28, 1950 |
| 2,622,987 | Ratcliffe | Dec. 23, 1952 |
| 2,635,057 | Jordan | Apr. 14, 1953 |
| 2,702,747 | Studebaker | Feb. 22, 1955 |
| 2,742,375 | Cooke et al. | Apr. 17, 1956 |
| 2,841,504 | Liggett | July 1, 1958 |
| 2,852,406 | Riegler | Sept. 16, 1958 |
| 2,982,665 | Wilcox | May 2, 1961 |

OTHER REFERENCES

Schwart et al.: "Surface Active Agents," Interscience Publishers, 1949, pp. 164–165.